(12) United States Patent
Krause et al.

(10) Patent No.: US 8,748,538 B2
(45) Date of Patent: Jun. 10, 2014

(54) GRAFT COPOLYMERS

(75) Inventors: Bernd Krause, Rangendingen (DE);
    Hermann Goehl, Bisingen-Zimmern
    (DE); Markus Storr, Filderstadt (DE);
    Ralf Menda, Bodelshausen (DE);
    Hans-Georg Herz, Marktoberdorf (DE);
    Joerg Williardt, Stuttgart (DE)

(73) Assignee: Gambro Lundia AB, Lund (SE)

( * ) Notice: Subject to any disclaimer, the term of this patent is extended or adjusted under 35 U.S.C. 154(b) by 0 days.

(21) Appl. No.: 13/583,827

(22) PCT Filed: Mar. 9, 2011

(86) PCT No.: PCT/EP2011/053549
    § 371 (c)(1),
    (2), (4) Date: Sep. 27, 2012

(87) PCT Pub. No.: WO2011/110600
    PCT Pub. Date: Sep. 15, 2011

(65) Prior Publication Data
    US 2013/0137784 A1    May 30, 2013

(30) Foreign Application Priority Data

Mar. 11, 2010  (EP) .................................... 10156193

(51) Int. Cl.
    *B01D 71/68*   (2006.01)
    *C08F 271/02*  (2006.01)
(52) U.S. Cl.
    USPC .............................. 525/189; 525/535; 521/27
(58) Field of Classification Search
    USPC ...................... 525/535, 189; 521/27
    See application file for complete search history.

(56) References Cited

U.S. PATENT DOCUMENTS

| | | | | |
|---|---|---|---|---|
| 3,740,362 A | * | 6/1973 | Gaylord et al. | 527/312 |
| 3,781,232 A | * | 12/1973 | Gaylord et al. | 527/312 |
| 5,459,199 A | * | 10/1995 | Yamamoto et al. | 525/104 |
| 5,643,968 A | | 7/1997 | Andreola et al. | |
| 7,368,505 B2 | * | 5/2008 | Mayes et al. | 525/118 |
| 2004/0026315 A1 | * | 2/2004 | Han et al. | 210/500.41 |

FOREIGN PATENT DOCUMENTS

| | | |
|---|---|---|
| EP | 0261734 | 3/1988 |
| EP | 0823281 | 2/1998 |
| EP | 0856352 | 8/1998 |
| JP | 62168503 A | 7/1987 |
| JP | 62199621 A | 9/1987 |
| JP | 62201603 A | 9/1987 |
| JP | 63084603 A | 4/1988 |
| JP | 63088003 A | 4/1988 |
| WO | WO2004/005402 | 1/2004 |
| WO | WO2004/058385 | 7/2004 |

OTHER PUBLICATIONS

Park et al. (Polysulfone-graft-poly(ethylene glycol) graft copolymers for surface modification of polysulfone membranes, Biomaterials, 27, 856-865, Feb. 2006).*
Charrier (Polymeric Materials and Processing, p. 126-127, Jan. 1991).*
Tzonganakis (Reactive Extrusion of Polymers: A Review, Advances in Polymer Technology, vol. 9 No. 4 321-330, Dec. 1989).*
PCT International Search Report and Written Opinion for PCT/EP2011/053549, mailed Jun. 21, 2011.

* cited by examiner

*Primary Examiner* — RAndy Gulakowski
*Assistant Examiner* — Christopher M Rodd
(74) *Attorney, Agent, or Firm* — Barnes & Thornburg LLP

(57) ABSTRACT

Graft copolymers of hydrophobic polymers and hydrophilic polymers, a method for their preparation, and their use in membranes for medical treatments such as hemodialysis, hemodiafiltration and hemofiltration, in membranes for water purification, and in membranes for bioprocessing.

14 Claims, No Drawings

GRAFT COPOLYMERS

CROSS-REFERENCE TO RELATED APPLICATIONS

This application is the U.S. national phase of PCT/EP2011/053549 filed Mar. 9, 2011. PCT/EP2011/053549 claims benefit under the Convention to EP 10156193.4 filed Mar. 11, 2010. The disclosures of EP 10156193.4 and PCT/EP2011/053549 are hereby incorporated herein by reference.

TECHNICAL FIELD

The present disclosure relates to graft copolymers of hydrophobic polymers and hydrophilic polymers, to a method for their preparation, and their use in membranes for medical treatments like hemodialysis, hemodiafiltration and hemofiltration, in membranes for water purification, and membranes for bioprocessing.

DESCRIPTION OF THE RELATED ART

Diffusion and/or filtration devices comprising hollow fiber membranes are used in various medical treatments which remove unwanted substances from body fluids, e.g., blood. Examples of such treatments are hemodialysis, hemodiafiltration and hemofiltration. The hollow fiber membranes usually comprise a hydrophobic polymer and a hydrophilic polymer. Polysulfones and polyethersulfones have been used as hydrophobic polymers in the preparation of such membranes and polyvinylpyrrolidone has been used as a hydrophilic polymer.

EP 0 261 734 B1 discloses a process for the preparation of hydrophilic membranes by coagulation of a solution of at least one hydrophobic polymer and at least one hydrophilic polymer and subsequent cross-linking of the hydrophilic polymer present in or on the membrane. The process involves conversion of the hydrophilic polymer into an essentially non-swollen state and cross-linking the essentially dry hydrophilic polymer by heating the membrane to a temperature between 50 and 350° C. In Example IV, a hollow fiber membrane is produced by spinning a solution of polyethersulfone and polyvinylpyrrolidone in N-methylpyrrrolidone into a water bath, dewatering the fiber with ethanol and hexane and heating the fiber to 140° C. for 20 hours.

EP 0 856 352 B1 discloses a polysulfone membrane for purifying blood containing a graft copolymer and/or block copolymer consisting of (A) a hydrophilic segment and (B) a hydrophobic segment (exclusive of polysulfone). The monomer unit ration of A to B in the copolymer is in the range of from 0.5 to 5, and the total of A and B is from 0.5 to 30 parts by weight of polysulfone.

WO 2004/058385 A1 discloses compositions useful for forming polysulfone semipermeable membranes by melt-spinning. The compositions comprise an ultra-high-molecular-weight hydrophilic polymer, preferably polyvinylpyrrolidone, a polysulfone compound, a solvent, e.g. sulfolane, and a non-solvent, e.g. a polyethylene glycol. The components of the compositions are combined and homogenized prior to melt-spinning, for instance in a compounding twin-screw extruder to produce a homogeneous molten liquid for extrusion. Graft copolymer formation does not occur at the conditions taught by this reference.

WO 2004/005402 A1 discloses graft copolymers of polysulfones and other polymers like polyethylene glycol or polypropylene glycol. The graft copolymers are produced by reacting chlorinated polysulfones with alkoxide ion intermediates.

EP 0 823 281 A1 discloses graft copolymers obtained by dissolving an ultraviolet light activatable polysulfone together with a polymerizable monomer in a solvent and irradiating the solution with ultraviolet light.

U.S. Pat. No. 5,643,968 A discloses graft copolymers obtained by metallating a polysulfone and reacting the metallated polysulfone with a polymerizable vinyl compound selected from 2-vinylpyridine and 4-vinylpyridine.

JP 62/168503 A discloses a polymer obtained by the graft polymerization of polysulfone with a hydrophilic copolymer. Polysulfone having a reactive terminal functional group is reacted with a hydrophilic copolymer having a reactive group in the side chain thereof.

JP 63/088003 A discloses a polymer obtained by the graft polymerization of polysulfone having reactive terminal functional groups of the sodium phenolate type with a hydrophilic copolymer.

JP 63/084603 A discloses a graft polymer consisting of a hydrophilic homopolymer as backbone and polysulfone polymer as the graft polymer.

JP 62/199621 A and JP 62/201603 A disclose block copolymers comprising a hydrophilic compound connected through covalent bonds to the terminal of an aromatic polysulfone polymer.

SUMMARY

It has now been found that graft copolymers of hydrophobic polymers having a glass transition temperature $T_g$ of >120° C. and hydrophilic polymers can be obtained by reactive blending, e.g., in an extruder. The graft copolymers can be used to prepare membranes, for instance flat sheet membranes or hollow fiber membranes, for medical treatments like hemodialysis, hemodiafiltration and hemofiltration

DETAILED DESCRIPTION

The present invention provides a graft copolymer comprising
i) 50 to 99 wt. %, for instance 70 to 99 wt. %, or even 90 to 99 wt. %, based on the total weight of the graft copolymer, of at least one hydrophobic polymer with $T_g$>120° C., and
ii) 1 to 50 wt. %, for instance 1 to 30 wt. %, or even 1 to 10 wt. %, based on the total weight of the graft copolymer, of at least one hydrophilic polymer.

The present invention also provides a process for preparing a graft copolymer comprising reactive blending of i) at least one hydrophobic polymer with $T_g$>120° C., and ii) at least one hydrophilic polymer.

In one embodiment of the invention, the at least one hydrophobic polymer having a glass transition temperature of greater than 120° C. is selected from the group consisting of polysulfones, polyethersulfones, polyamides, polycarbonates, polyethyleneimines, and cycloolefin copolymers. In another embodiment, the at least one hydrophobic polymer having a glass transition temperature of greater than 120° C. is selected from polysulfones and polyethersulfones.

In one embodiment of the invention, a polysulfone having a weight average molecular weight of from 40,000 to 100,000 g/mol, for instance, 70,000 to 85,000 g/mol, is used as a starting material. Examples of suitable polysulfones are available from Solvay S.A., under the trade name Udel®

P-1700 NT LCD, Udel® P-1800, Udel® P-3500 NT LCD, and Udel® P-1835, or from BASF S.E., under the trade name Ultrason® S 6010.

In one embodiment of the invention, a polyethersulfone having a weight average molecular weight of from 30,000 to 80,000 g/mol, for instance, from 40,000 to 60,000 g/mol, is used as a starting material. Examples of suitable polyethersulfones are available from BASF S.E., under the trade name Ultrason® E 6020 P, or from Solvay S.A., under the trade name Gafone® 3000P, Gafone® 3100P and Gafone® 3200P.

In one embodiment of the invention, the at least one hydrophilic polymer is selected from the group consisting of polyvinylpyrrolidones, polyethyleneglycols, and polyoxazolines. In another embodiment, the at least one hydrophilic polymer comprises polyvinylpyrrolidone.

In one embodiment of the invention, a polyvinylpyrrolidone having a number average molecular weight of from 10,000 to 500,000 g/mol and a weight average molecular weight of from 40,000 to 2,500,000 g/mol is used as a starting material. Examples include a polyvinylpyrrolidone having a number average molecular weight of from 10,000 to 20,000 g/mol and a weight average molecular weight of 40,000 to 60,000 g/mol, a polyvinylpyrrolidone having a number average molecular weight of from 150,000 to 500,000 g/mol and a weight average molecular weight of from 700,000 to 2,500,000 g/mol, a polyvinylpyrrolidone having a number average molecular weight of from 200,000 to 400,000 g/mol and a weight average molecular weight of from 900,000 to 2,000,000 g/mol, and a polyvinylpyrrolidone having a number average molecular weight of from 200,000 to 300,000 g/mol and a weight average molecular weight of from 900,000 to 1,200,000 g/mol. In another embodiment, a mixture of a polyvinylpyrrolidone having a molecular weight of less than 100,000 g/mol and a polyvinylpyrrolidone having a molecular weight of at least 100,000 g/mol is used as a starting material. Examples of suitable polyvinylpyrrolidones are available from BASF S.E., under the trade name Luvitec®. An example of a suitable polyvinylpyrrolidone having a molecular weight of less than 100,000 g/mol is available under the trade name Luvitec® K30. Examples of suitable polyvinylpyrrolidones having a molecular weight of at least 100,000 g/mol are available under the trade name Luvitec® K85 or Luvitec® K90, respectively.

In one embodiment of the invention, reactive blending is performed in an extruder, e.g. a twin screw extruder having three to five mixing zones and a ratio L/D (length to diameter) in the range of from 20 to 45, e.g., from 32 to 40.

In one embodiment of the process, the weight ratio of the at least polysulfone and/or polyethersulfone to the at least one polyvinylpyrrolidone in the reaction mixture fed to the extruder is in the range of from 50:50 to 95:5, for instance, from 70:30 to 90:10.

In one embodiment of the process, the reaction mixture does not contain a polymerization initiator. In one embodiment, reactive blending is performed in the presence of air. In one embodiment of the process, air or oxygen is introduced into the extruder during reactive blending.

In another embodiment of the process, a polymerization initiator is added to the reaction mixture. The polymerization initiator may be a free-radical initiator, a photoinitiator, or a redox initiator. In one embodiment, a free-radical initiator is used. Examples of suitable initiators are 2,3-dimethyl-2,3-diphenyl butane, 3,4-dimethyl-3,4-diphenyl butane, tert.-butyl hydro peroxide, or polycumene. The concentration of the polymerization initiator generally is in the range of from 0.08 to 5 wt. % of the total weight of the reaction mixture, for instance from 0.15 to 0.5 wt. %, relative to the total weight of the reaction mixture.

In one embodiment of the process, the temperature in the mixing zones of the extruder is in the range of from 280° C. to 350° C., for instance, from 300° C. to 320° C.

In one embodiment of the process, the dwell time of the reaction mixture in the extruder is in the range of from 5 to 10 minutes, for instance, from 6 to 8 min.

In various embodiments, the process employs a mixture of i) 50 to 95 wt. %, relative to the total weight of the mixture, of at least one hydrophobic polymer having a glass transition temperature of greater than 120° C., and ii) 5 to 50 wt. %, relative to the total weight of the mixture, of at least one hydrophilic polymer is used as starting material for reactive blending.

The reaction mixture leaving the extruder is solidified and subsequently can be further processed. In one embodiment, the strand of extrudate leaving the extruder is conducted through a cooling bath to solidify the polymer. In one embodiment, the cooling bath contains water.

The strand of extrudate can be cut or granulated to produce beads or granules. In one embodiment of the process, the beads or granules formed are subsequently dried.

In one embodiment of the invention, the product obtained by the reactive blending process is used without further processing. For instance, the extrudate can be dissolved in a suitable solvent to produce a polymer solution for the production of flat sheet membranes or hollow fiber membranes. Examples of suitable solvents include dichloromethane, N-methylpyrrolidone (NMP) and dimethyl acetamide (DMAC). In one embodiment, NMP is used to dissolve the extrudate.

In another embodiment of the invention, the product obtained by the reactive blending process is further processed to remove unreacted starting materials and by-products, for instance, unreacted polyvinylpyrrolidone. In one embodiment, the extrudate is dissolved in a solvent and subsequently precipitated by addition of a precipitation medium. Examples of suitable solvents include dichloromethane, N-methylpyrrolidone (NMP) and dimethyl acetamide (DMAC). Examples of suitable precipitation media include water and alcohols like methanol or ethanol. In one embodiment, residual amounts of soluble polyvinylpyrrolidone are removed from the precipitate by extraction. Examples of suitable extraction media include methanol, ethanol, tetrahydrofurane, and supercritical carbon dioxide. In one embodiment, the precipitate is extracted with methanol. In one embodiment, the precipitate is subsequently dried to remove volatiles.

The processed product can be dissolved in a suitable solvent to produce a polymer solution for the production of porous flat sheet membranes or hollow fiber membranes. In one embodiment of the invention, the membranes have a mean pore diameter in the range of from 1 nm to 500 nm. In one embodiment, the membranes are asymmetric membranes, i.e. the mean diameter of the pores of one surface of the membrane is different from the mean pore diameter on the other membrane surface. For instance, the pores on the lumen surface of a hollow fiber membrane may be smaller or larger than the pores on the outside surface of the hollow fiber membrane. In one embodiment, the mean diameter of the pores on the surface having the smaller pores is in the range of from 1 nm to 500 nm, for instance, from 1 to 10 nm, or from 150 to 300 nm.

Examples of suitable solvents include dichloromethane, dimethyl sulfoxide, N-methyl pyrrolidone (NMP), N-ethyl pyrrolidone (NEP) N-octyl pyrrolidone (NOP), and dimethyl acetamide (DMAC). In one embodiment, the product is dissolved in NMP. In another embodiment, the product is dissolved in DMAc.

The membranes produced from the graft polymer of the invention can be used for medical treatments like hemodialysis, hemodiafiltration and hemofiltration. The membranes may also be used for water purification or for bioprocessing.

It will be understood that the features mentioned above and those described hereinafter can be used not only in the combination specified but also in other combinations or on their own, without departing from the scope of the present invention.

The present invention will now be described in more detail in the examples below. It is to be understood that the examples are not intended to limit the scope of the present invention and are merely an illustration of a preferred embodiment of the invention.

EXAMPLES

Reactive Blending

Starting Materials

PSU1: polysulfone Udel® P-1700 NT06, Solvay S.A.; $M_n$ approx. 40 kDa

PSU2: polysulfone Udel® P-3500 NT LCD, Solvay S.A.;

PES: polyethersulfone Ultrason® E 6020 P, BASF S.E.; $M_w$=46-55 kDa; $M_w/M_n$=3.0-4.0;

PVP-K30: polyvinylpyrrolidone Luvitec® K30, BASF S.E.; $M_n$=14 kDa, $M_w$=50 kDa;

PVP-K85: polyvinylpyrrolidone Luvitec® K85, BASF S.E.; $M_n$=250 kDa, $M_w$=1,100 kDa;

DMDPB: 2,3-dimethyl-2,3-diphenyl butane.

The polymers were dried overnight at 80° C. before use.

Equipment

Laboratory extruder Theysohn TSK 20/40D, co-rotating twin-screw, d=20 mm, L/D=40, 3 mixing zones (with 5 kneading elements each); throughput 0,3-6 kg/h.

Determination of PVP Content of the Graft Polymer

For the determination of the PVP content of the graft copolymers obtained, the extrudate was dissolved in NMP to produce a 10% (w/w) solution and precipitated from the solution by the addition of methanol. The precipitate was transferred to a Soxhlett extractor, extracted with methanol for 65 hrs to remove any residual PVP not chemically bound in the graft copolymer, and subsequently dried.

Polysulfone/polyvinylpyrrolidone copolymers were dissolved in $CDCl_3$. $^1$H-NMR spectra were recorded and PVP content was calculated from the integrals of the signal at 3.0-3.5 ppm (2H) for polyvinylpyrrolidone, 7.84 ppm (4H) for polysulfone and the molecular weights of the respective repeating units (polysulfone 442.53 g/mol; polyvinylpyrrolidone 111.14 g/mol).

Polyethersulfone/polyvinylpyrrolidone copolymers were dissolved in $d_6$-DMSO. $^1$H-NMR spectra were recorded and PVP content was calculated from the integrals of the signal at 2.85-3.35 ppm (2H) for polyvinylpyrrolidone, 8.0 ppm (4H) for polyethersulfone and the molecular weights of the respective repeating units (polyethersulfone 232.26 g/mol; polyvinylpyrrolidone 111.14 g/mol).

Example 1

Polymer mixtures were processed using the following conditions:
temperature profile of the extruder: inlet 75° C., pre-heating zone 300° C., processing zones 310° C./310° C., nozzle 320° C.;
speed of screw 60 rpm;
Feed rate 500 g/hr.

a) PES and PVP-K85 at a weight ratio of 50:50; content of chemically bound PVP in the product was 9.2 wt. %;

b) PSU1 and PVP-K85 at a weight ratio of 70:30; content of chemically bound PVP in the product was 9.8 wt. %;

c) PSU1 and PVP-K85 at a weight ratio of 70:30+0.15 wt. %, relative to the total weight of polymer, of DMDPB; content of chemically bound PVP in the product was 12.8 wt. %;

d) PSU1 and PVP-K85 at a weight ratio of 70:30+0.30 wt. %, relative to the total weight of polymer, of DMDPB; content of chemically bound PVP in the product was 16.5 wt. %;

e) PSU1 and PVP-K85 at a weight ratio of 70:30+1.50 wt. %, relative to the total weight of polymer, of DMDPB; content of chemically bound PVP in the product was 14.8 wt. %;

f) PES and PVP-K85 at a weight ratio of 70:30+0.15 wt. %, relative to the total weight of polymer, of DMDPB; content of chemically bound PVP in the product was 7.6 wt. %;

g) PES and PVP-K85 at a weight ratio of 70:30+0.30 wt. %, relative to the total weight of polymer, of DMDPB; content of chemically bound PVP in the product was 14.6 wt. %;

h) PES and PVP-K85 at a weight ratio of 70:30+1.50 wt. %, relative to the total weight of polymer, of DMDPB; content of chemically bound PVP in the product was 10.0 wt. %;

i) PSU1 and PVP-K85 at a weight ratio of 90:10+0.50 wt. %, relative to the total weight of polymer, of DMDPB; content of chemically bound PVP in the product was 7.0 wt. %;

j) PES and PVP-K85 at a weight ratio of 90:10+0.50 wt. %, relative to the total weight of polymer, of DMDPB; content of chemically bound PVP in the product was 3.6 wt. %;

k) PSU1 and PVP-K30 at a weight ratio of 90:10+0.08 wt. %, relative to the total weight of polymer, of DMDPB; content of chemically bound PVP in the product was 2.3 wt. %;

l) PSU1 and PVP-K30 at a weight ratio of 90:10+0.15 wt. %, relative to the total weight of polymer, of DMDPB; content of chemically bound PVP in the product was 4.1 wt. %;

m) PSU1 and PVP-K30 at a weight ratio of 90:10+0.30 wt. %, relative to the total weight of polymer, of DMDPB; content of chemically bound PVP in the product was 3.7 wt. %;

n) PSU1 and PVP-K30 at a weight ratio of 90:10+1.5 wt. %, relative to the total weight of polymer, of DMDPB; content of chemically bound PVP in the product was 2.5 wt. %;

o) PSU1 and PVP-K30 at a weight ratio of 90:10+5.0 wt. %, relative to the total weight of polymer, of DMDPB; content of chemically bound PVP in the product was 1.7 wt. %.

Example 2

A mixture of PSU1 and PVP-K85 at a weight ratio of 90:10+0.50 wt. %, relative to the total weight of polymer, of DMDPB was processed at different extrusion temperatures:

a) 300° C.; content of chemically bound PVP in the product was 2.0 wt. %;

b) 310° C.; content of chemically bound PVP in the product was 2.8 wt. %;

c) 320° C.; content of chemically bound PVP in the product was 2.4 wt. %;

d) 330° C.; content of chemically bound PVP in the product was 2.4 wt. %;

e) 340° C.; content of chemically bound PVP in the product was 1.9 wt. %;
f) 350° C.; content of chemically bound PVP in the product was 1.6 wt. %.

Example 3

A mixture of PSU1 and PVP-K85 at a weight ratio of 90:10+0.50 wt. %, relative to the total weight of polymer, of DMDPB was processed using the temperature profile as in Example 1; speed of the extruder screw and dwell time of the reaction mixture in the extruder were varied:
a) 20 rpm, 8.4 min; content of chemically bound PVP in the product: 1.2 wt. %;
b) 60 rpm, 6.6 min; content of chemically bound PVP in the product: 1.4 wt. %;
c) 80 rpm, 6.1 min; content of chemically bound PVP in the product: 1.4 wt. %;
d) 120 rpm, 5.5 min; content of chemically bound PVP in the product: 1.1 wt. %.

Example 4

A mixture of PSU2 and PVP-K30 at a weight ratio of 90:10+0.30 wt. %, relative to the total weight of polymer, of DMDPB was processed using the conditions defined in Example 1. The extruded strand of product was quenched in a water bath and subsequently granulated. The granulated product was dried at 80° C. for 5 hrs. The content of chemically bound PVP in the product was 2.0 wt. %.

Preparation of Membranes
Measurement of Hydraulic Permeability (Lp)

The membrane is immersed in RO water for 30 minutes. Then the module is mounted into the Lp test device in horizontal position under water thermostatted at 37° C., and water is filtered through a defined membrane surface (28.3 cm$^2$) at a gage pressure of 600 mm Hg. The volume of filtered water and the time required are measured and the hydraulic permeability Lp is calculated according to equation 2:

$$Lp = \frac{V}{p \cdot A \cdot t} \quad (2)$$

with:
Lp=hydraulic permeability [*10$^{-4}$ cm/(bar*s)]
V=volume of water filtered through the membrane [cm$^3$]
p=applied pressure [bar]
t=duration of measurement [s]
A=effective surface [cm$^2$]

Example 5

A solution comprising 15.56 wt. % of the polymer obtained in Example 4 and 84.44 wt. % NMP was prepared by stirring the polymer in NMP at 60° C. overnight. The solution had a viscosity of 464 mPa*s at 22° C. The solution was filtered and degassed and cast onto a glass plate at room temperature. A film was prepared using a doctor blade with a 90 µm gap at a speed of 25 mm/s.

Different precipitation conditions were used to obtain flat sheet membranes:
a) the glass plate was immersed for 1 minute in a water bath having a temperature of 20° C. to precipitate the film;
b) the glass plate was immersed for 1 minute in a water bath having a temperature of 50° C. to precipitate the film;
c) the glass plate was immersed for 5 minutes in a mixture of 50 wt. % water and 50 wt. % NMP having a temperature of 30° C. to precipitate the film.

The membranes obtained were dried overnight at 60° C. The thickness of the membranes obtained was approximately 40 µm. Hydraulic permeability Lp of the membranes was determined to be 2.3*10$^{-4}$ cm/bars for membrane a), 9.8*10$^{-4}$ cm/bars for membrane b), and 1.7*10$^{-4}$ cm/bars for membrane c).

The invention claimed is:

1. A process for preparing a graft copolymer comprising reactive blending in an extruder of i) at least one hydrophobic polymer having a glass transition temperature of greater than 120° C., and ii) at least one hydrophilic polymer, wherein the temperature in the mixing zones of the extruder is in the range of from 300° C. to 350° C., characterized in that prior to initiation of the process, neither the hydrophobic polymer nor the hydrophilic polymer has any reactive groups that would enable the two polymers to react with each other.

2. The process of claim 1, wherein the at least one hydrophobic polymer is selected from the group consisting of polysulfones, polyethersulfones, polyamides, polycarbonates, polyethyleneimines, and cycloolefin copolymers.

3. The process of claim 2, wherein the at least one hydrophobic polymer is selected from polysulfones and polyethersulfones.

4. The process of claim 1 wherein the at least one hydrophilic polymer is selected from the group consisting of polyvinylpyrrolidones, polyethyleneglycols, and polyoxazolines.

5. The process of claim 4, wherein the at least one hydrophilic polymer comprises polyvinylpyrrolidone.

6. The process of claim 1 wherein a mixture of i) 50 to 95 wt. %, relative to the total weight of the mixture, of at least one hydrophobic polymer having a glass transition temperature of greater than 120° C., and ii) 5 to 50 wt. %, relative to the total weight of the mixture, of at least one hydrophilic polymer is used as starting material for reactive blending.

7. The process of claim 2 wherein the at least one hydrophilic polymer is selected from the group consisting of polyvinylpyrrolidones, polyethyleneglycols, and polyoxazolines.

8. The process of claim 3 wherein the at least one hydrophilic polymer is selected from the group consisting of polyvinylpyrrolidones, polyethyleneglycols, and polyoxazolines.

9. The process of claim 7 wherein the at least one hydrophilic polymer comprises polyvinylpyrrolidone.

10. The process of claim 8 wherein the at least one hydrophilic polymer comprises polyvinylpyrrolidone.

11. The process of claim 2 wherein a mixture of i) 50 to 95 wt. %, relative to the total weight of the mixture, of at least one hydrophobic polymer having a glass transition temperature of greater than 120° C., and ii) 5 to 50 wt. %, relative to the total weight of the mixture, of at least one hydrophilic polymer is used as starting material for reactive blending.

12. The process of claim 3 wherein a mixture of i) 50 to 95 wt. %, relative to the total weight of the mixture, of at least one hydrophobic polymer having a glass transition temperature of greater than 120° C., and ii) 5 to 50 wt. %, relative to the total weight of the mixture, of at least one hydrophilic polymer is used as starting material for reactive blending.

13. The process of claim 4 wherein a mixture of i) 50 to 95 wt. %, relative to the total weight of the mixture, of at least one hydrophobic polymer having a glass transition temperature of greater than 120° C., and ii) 5 to 50 wt. %, relative to the total weight of the mixture, of at least one hydrophilic polymer is used as starting material for reactive blending.

14. The process of claim 5 wherein a mixture of i) 50 to 95 wt. %, relative to the total weight of the mixture, of at least one hydrophobic polymer having a glass transition temperature of greater than 120° C., and ii) 5 to 50 wt. %, relative to the total weight of the mixture, of at least one hydrophilic polymer is used as starting material for reactive blending.

* * * * *